(12) United States Patent
Abileah et al.

(10) Patent No.: US 8,230,626 B2
(45) Date of Patent: Jul. 31, 2012

(54) FLAME SIMULATING ASSEMBLY WITH ELECTRONIC DISPLAY AND BACKLIGHT

(75) Inventors: Adiel Abileah, Portland, OR (US); Allen Gard, Portland, OR (US)

(73) Assignee: Planar Systems, Inc., Beaverton, OR (US)

( * ) Notice: Subject to any disclaimer, the term of this patent is extended or adjusted under 35 U.S.C. 154(b) by 435 days.

(21) Appl. No.: 12/441,531

(22) PCT Filed: Sep. 12, 2007

(86) PCT No.: PCT/US2007/078307
§ 371 (c)(1),
(2), (4) Date: Mar. 16, 2009

(87) PCT Pub. No.: WO2008/033949
PCT Pub. Date: Mar. 20, 2008

(65) Prior Publication Data
US 2009/0241386 A1    Oct. 1, 2009

Related U.S. Application Data

(60) Provisional application No. 60/825,701, filed on Sep. 14, 2006.

(51) Int. Cl.
*G09F 19/00* (2006.01)
(52) U.S. Cl. .......................................................... 40/428
(58) Field of Classification Search ...................... 40/428
See application file for complete search history.

(56) References Cited

U.S. PATENT DOCUMENTS

| | | | |
|---|---|---|---|
| 5,195,820 A * | 3/1993 | Rehberg | 126/523 |
| 6,050,011 A * | 4/2000 | Hess et al. | 40/428 |
| 6,385,881 B1 | 5/2002 | Hess | |
| 2003/0046837 A1 * | 3/2003 | Hess | 40/428 |
| 2003/0201957 A1 * | 10/2003 | Mix et al. | 345/87 |
| 2006/0162198 A1 | 7/2006 | Hess | |
| 2008/0013931 A1 * | 1/2008 | Bourne | 392/348 |
| 2008/0037254 A1 * | 2/2008 | O'Neill | 362/293 |
| 2008/0216366 A1 * | 9/2008 | Purton et al. | 40/428 |

FOREIGN PATENT DOCUMENTS

| | | | |
|---|---|---|---|
| GB | 2232481 A | * | 12/1990 |
| GB | 2412429 A | * | 9/2005 |
| WO | WO2005/059443 A1 | | 6/2005 |
| WO | WO 2006/040167 A2 | * | 4/2006 |
| WO | WO2006/074544 A1 | | 7/2006 |
| WO | WO 2006/128917 A1 | * | 12/2006 |

OTHER PUBLICATIONS

International Search Report, PCT/US2007/078307, Feb. 26, 2008.

* cited by examiner

*Primary Examiner* — Mike Stahl
(74) *Attorney, Agent, or Firm* — Stoel Rives LLP

(57) ABSTRACT

A flame simulating apparatus (100) includes a transparent electronic display device (116) for displaying images of flickering flames. The electronic display (116) may be positioned in front of at least a portion of a simulated fuel bed (124) or other fireplace objects, so that the simulated fuel bed (124) or other fireplace object is visible through the display device (116). A backlight (118) may be spaced apart from the display device (116) to accommodate a portion of the simulated fuel bed (124) between the display device (116) and the backlight (118) to generate depth perception. To facilitate viewing of side margins of the display device (116), side reflectors (150) may be provided or the backlight (118) may be made wider than the display device (116). In some embodiments, a diffusion layer (217) is positioned proximate the transparent electronic display (216) and configured to be switchable between permitting viewing objects behind the display device (216) and preventing viewing objects behind the display device (216).

22 Claims, 4 Drawing Sheets

FLAME SIMULATING ASSEMBLY WITH ELECTRONIC DISPLAY AND BACKLIGHT

RELATED APPLICATION

This application claims the benefit under 35 U.S.C. §119 (e) from U.S. Provisional Application No. 60/825,701, filed on 14 Sep. 2006, which is incorporated herein by reference.

TECHNICAL FIELD

This application relates generally to the field of flame simulating assemblies.

BACKGROUND

Simulated fireplaces take many forms including real flames with simulated fuel beds, electronic representations of flames with simulated fuel beds, and electronic simulations of flames and fuel beds. An example of real flames with a simulated fuel bed is a natural gas fireplace where gas is niped to certain locations within a structure constructed to look like fuel, such as a pile of logs. The gas is ignited, and people viewing the simulated fireplace see and feel flames that appear to be "burning" the logs.

An example of an electronic representation of flames with a simulated fuel bed is provided in UK patent application GB 2419182. A flame representation, such as FIG. 10, is displayed on a screen 130, 530 (FIGS. 4 and 9). Screens 130, 530, for example, are made see-through, or the bottom, front portion is reflective, as also described in U.S. Patent Publication No. 2006/0162198, In either case, the intended effect is to make it appear as if the electronic flames emanate from within the simulated fuel bed.

An example of an electronically simulated flame and fuel bed is shown in U.S. D410,346 which shows a television cabinet made to look like a fireplace. A picture of a fire shown on the television may display an electronically recorded video of both a flame and fuel consumed by the flame.

DETAILED DESCRIPTION OF EMBODIMENTS

Figure 1:
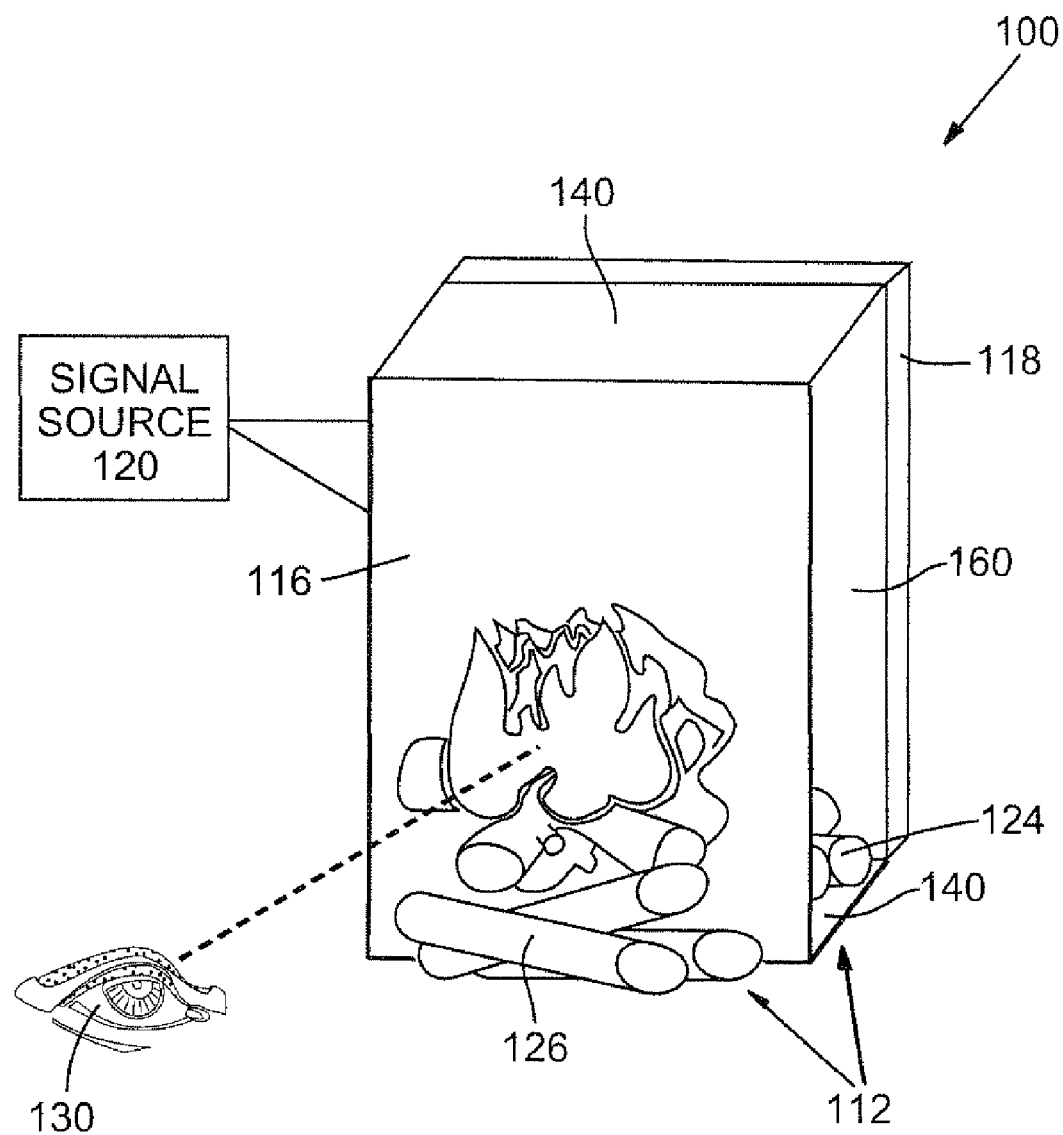
FIG. 1 is a pictorial schematic view of a flame simulating assembly according to a first embodiment.

FIG. 1 depicts a flame simulating assembly 100 according to a first embodiment including a simulated fuel bed 112 and a transparent display device 116, described in more detail below, and a backlight 118. Portions of the simulated fuel bed 112 are preferably located on both sides of the display device 116. In the embodiment shown, the simulated fuel bed 112 includes both a rear portion 124 located behind the display device 116, and a front portion 126 located in front of the display device 116 and proximal of the viewing position 130. So positioned, the transparent display device 116 and simulated fuel bed 112 cooperate to provide the illusion of flames emanating from the fuel bed 112. The simulated fuel bed 112 may simulate any of a variety of fuels, such as logs, coal, or other fuels, and may be formed of plastic or another material.

To promote the illusion of a fueled fireplace, a simulated firebox 160 comprising pictorial images or textured models of brickwork, or other firebox material, may be located behind the transparent display device 116 and the simulated fuel bed 112. Other features (not shown), such as an electric heater and audio of crackling flames, may also be included to further enhance the simulated fireplace effect.

The transparent display device 116 may comprise emissive or non-emissive display panels. Emissive display panels generally generate light, while non-emissive display panels may require back-lighting to enhance viewing the image on the display panel. Examples of emissive displays include electroluminescent (EL) and organic light-emitting diode (OLED) displays. Examples of non-emissive displays include liquid crystal displays (LCD) and active matrix liquid crystal displays (AMLCD).

In some embodiments, the transmissive display device 116 includes a non-emissive flat panel display capable of full-color video, such as an AMLCD. In alternative embodiments, flat panel display technologies other than AMLCD may be used. The transparent display device 116 should preferably have a fast response time (for example 12 milliseconds) to provide realistic flame flickering effects. The display device 116 should be bright enough to allow video images of flames to be easily viewed in a lighted room and should have a relatively wide viewing angle, particularly side-to-side.

A video signal source 120 may be coupled to display device 116 and may comprise any of a variety of full-motion video sources or other image driver signals, such as a personal computer, digital video disc (DVD) player, digital video recorder (DVR), video cassette tape player (VCR), a cable-TV signal receiver, or broadcast video signal receiver. Video signals from signal source 120 may drive display device 116 to display video images of flames thereon.

A conventional AMLCD structure (not shown) includes a non-emissive display panel for modulating light through a number of picture elements (pixels) of the AMLCD panel by way of changing the polarization properties of a liquid crystal between front and rear polarizers. The pixels change their transmission properties depending on driving voltages that are addressing each of them. Different pixels have different color filters (typically—red, green and blue), and adjacent sets of different-colored pixels driven individually to different voltages allows the display to produce a full range of colors by way of combining the different-colored pixels. AMLCD displays typically require a good backlight, and in a typical AMLCD structure the backlight is positioned directly adjacent the display panel.

Unlike conventional AMLCD arrangements of the type used in computers, televisions, and other information display applications, the backlight 118 of flame simulating assembly 100 is spaced apart from display device 116 to accommodate at least a portion of the simulated fuel bed 112 between the display device 116 and the backlight 118. Because the display device 116 may be transparent, that is, may range from permitting uninhibited viewing of objects behind the display device 116 to barely permitting viewing objects behind the display device 116, the rear portion 124 of the simulated fuel bed 112 can be seen by the viewer 130 through the display device 116, and the flame images displayed on the display device 116 appear to emanate from within the simulated fuel bed 112. The display device 116 need not be perfectly transparent (in other words, without appreciable absorption, distortion, or light scattering), but is preferably sufficiently transparent to allow the rear portion 124 of the simulated fuel bed 112 to be seen through the display device 116 by the viewer 130. Thus, the term "transparent," as used herein, is a functional term, rather than a technical one. The simulated fuel bed 112 may be illuminated from within to provide the illusion of glowing embers, or illuminated by a light source (not shown) outside of the simulated fuel bed 112 but behind the display device 116, for example from the top of the space between the display device 116 and the backlight 118.

In one embodiment, the backlight 118 is spaced apart from the display device 116 by a distance in the range of approximately 4 inches to approximately 6 inches. This distance is sufficient to accommodate the rear portion 124 of the simulated fuel bed 112 and to provide visual depth perception between the simulated flame images on the display device 116 and a simulated firebox 160 behind the display device 116. Greater or lesser spacing distances may also be employed. In one embodiment (not shown) the backlight 118 is spaced between 6 inches and 10 inches from the display device 116. This distance may generate a depth perception and illusion that the simulated firebox 160 behind the logs is real. A smaller gap of, for example, 2 inches will have less space for the simulated logs, but still provide depth perception. Larger gaps of up to 20 inches or more are also possible, but may tend to reduce the amount of illumination reaching the display device 116.

The present inventors recognized that spacing the backlight 118 away from the display device 116 undesirably reduces the brightness and image quality around the margins of the display device 116, particularly when the display device 116 is viewed at angles other than orthogonal to display device 116. Generally, the greater the spacing between the display device 116 and the backlight 118, the more significant the loss of brightness at the margins. To improve illumination at the margins, a reflective material 150 (FIG. 2) may be coincident, that is, attached, juxtaposed, placed next to, on, along, or otherwise proximal, to sidewalls 140 bordering the space between the display device 116 and the backlight 118, as described below with reference to FIG. 2.

Figure 2:
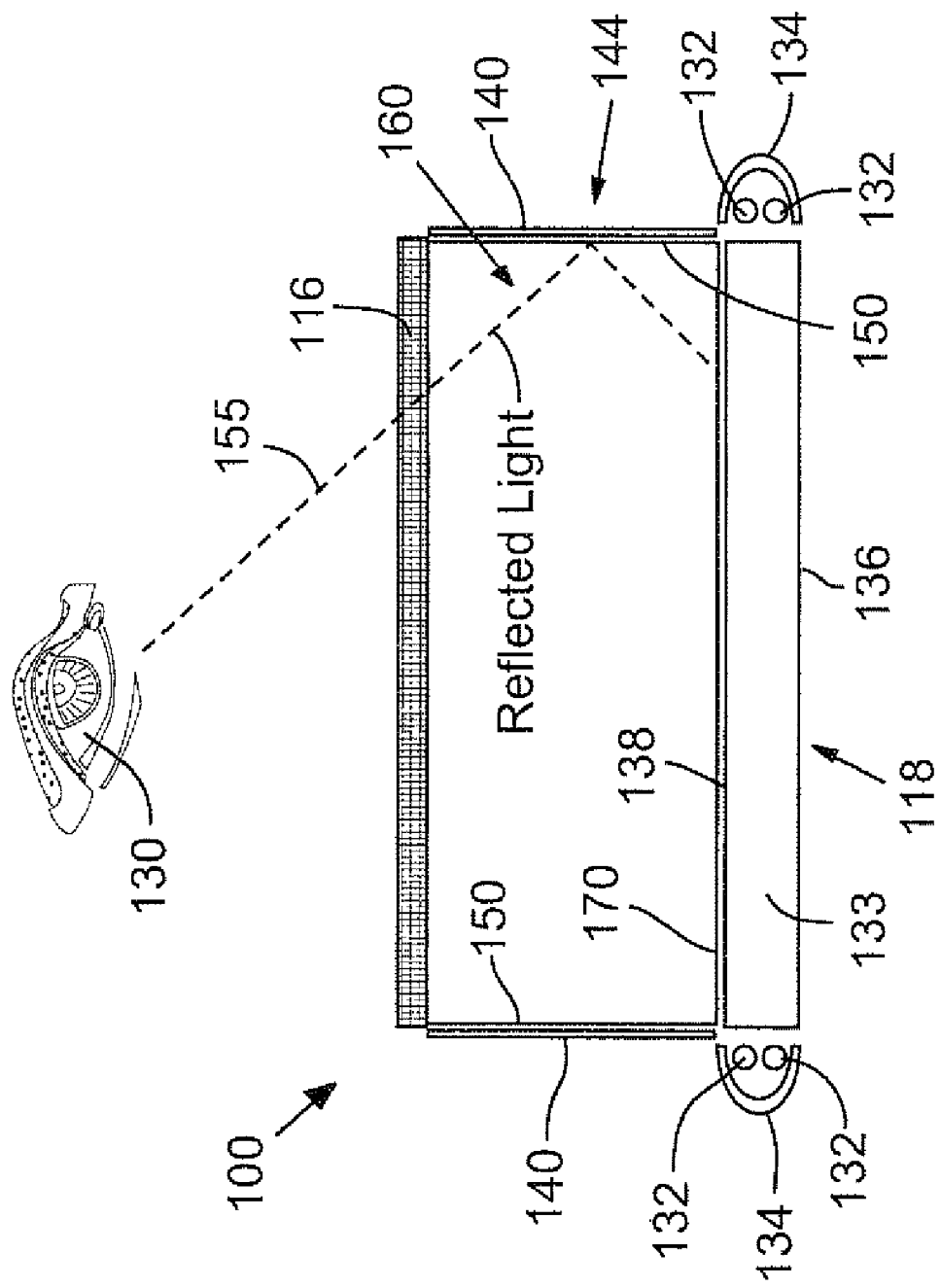
FIG. 2 is a top schematic view of the flame simulating assembly of FIG. 1.

FIG. 2 is a top view schematic representation of the flame simulating assembly 100 of FIG. 1. The backlight 118 is preferably specially configured for greater luminous intensity than a conventional AMLCD backlight. For example, the backlight 118 may have a luminous intensity of approximately 1000 candela per square meter ($cd/m^2$), whereas conventional AMLCD backlights for desktop computer displays have an intensity of about 250 $cd/m^2$ (measured through the AMLCD panel). The backlight 118 may be side-illuminated with an increased number of cold cathode fluorescent lamp (CCFL) units over the standard two CCFL lamps (one on each side) of a conventional backlight. One possible configuration includes four CCFL lamps 132, two on each side of a light guide 133, as illustrated in FIG. 2. Focusing reflectors 134 direct light from the lamps 132 into the light guide 133. A reflector 136 is provided at the rear of the light guide 133 and a diffuser layer 138 is positioned at the front surface of the light guide 133 (between the light guide 133 and the display device 116) to improve image brightness, uniformity and viewing angles. The diffusing layer 138 is preferably made of a non-birefringent material. Suitable diffuser materials include translucent or "milky" plastic films, brightness enhancement film (BEF) or double brightness enhancement film (DBEF) made by 3M Company, and similar diffusing materials, such as lensiets and holographic diffusers. Other backlight arrangements utilizing similar, or different, light sources and materials may be used as well. For example, LED (Light Emitting Diodes) of either white emitting or grouped in clusters of red, green, and blue emitting diodes may be used when combined with optical diffusing or refracting lenses.

With reference to FIGS. 1 and 2, an enclosure 144 of the flame simulating assembly 100 has four sidewalls 140 extending between display device 116 and backlight 118. Side reflectors 150 (FIG. 2) comprising a reflective material may be coincident with any or all of the sidewalls 140. Side reflectors 150 may be attached to sidewalls 140, for example, by coating or covering sidewalls 140 with a reflective paint, film or material, by using an adhesive or other suitable material, or other suitable attachment method. Side reflectors 150 reflect light generated by the backlight 118 to facilitate viewing of the edges of the display device 116 from an angle, as illustrated by the dashed sight line 155 of viewer 130 in FIG. 2. Without side reflectors 150, the edges or margins of the display device 116 may appear dark relative to other portions of the display device 116 when viewed from an angle.

Simulated firebox 160 may comprise images on side reflectors 150 and on a rear wall or backlight 118, singularly or in any combination. The side reflectors 150 preferably include images of the inside of a firebox, for example brickwork (not shown), to emulate sidewalls of a fireplace. Side reflectors 150 are also preferably diffusive or covered by a diffusive film (not shown) to prevent the reflection of sharp edges and other artifacts, and to illuminate in a more aesthetically pleasing and realistic manner. Top sidewall 140 (FIG. 1) and bottom sidewall 140 of the enclosure 144 may be covered by similar reflectors, although the top and bottom reflectors may have image patterns different from the patterns of the side reflectors 150. A semi-transparent film 170 bearing images of the inside of a firebox may be applied over portions of, or the entire, backlight 118 to simulate a rear wall of a fireplace. The film 170 is preferably highly transmissive so as not to greatly attenuate the illumination generated by the backlight 118 and is also preferably made of a non-birefringent material such as polycarbonate to reduce brightness losses at the rear polarizer of the AMLCD device 116.

Figure 3:
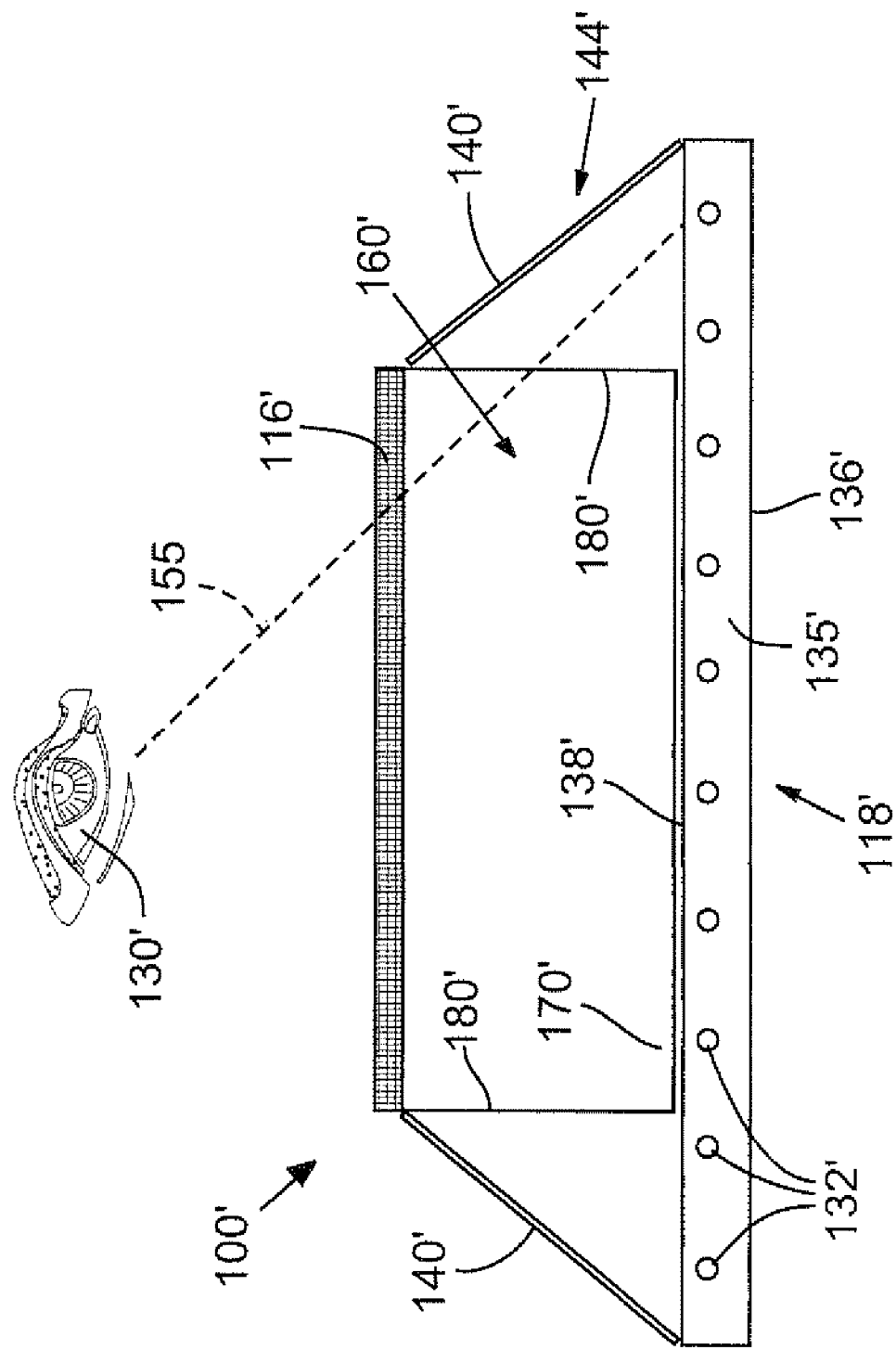
FIG. 3 is a top schematic view of a flame simulating assembly according to a second embodiment.

FIG. 3 is a top view schematic representation of a flame simulating apparatus 100' in accordance with a second embodiment. The flame simulating apparatus 100' includes an AMLCD display device 116', a backlight 118' spaced apart from the display device 116', and a simulated fuel bed (not shown) having a rear portion positioned between the display device 116' and the backlight 118' and a front portion positioned in front of the display device 116'. The backlight 118' may be spaced apart from the display device 116' by approximately the same distance as in the embodiment of FIG. 2, but the backlight 118' of FIG. 3 is wider than the display device 116' to improve the visibility and brightness of the left and right margins of the display device 116' without the use of side reflectors 150.

The backlight 118' of flame simulating apparatus 100' may be a similar side-illuminated design as the backlight 118 of the first embodiment. Alternatively, as illustrated in FIG. 3, the backlight 118' may instead include a cavity structure 135' within which several CCFL lamp rods 132' lie generally in a plane parallel to the display device 116'. A reflector 136' is provided at the rear of the cavity 135' and a diffusing layer 138', such as milky white plastic film, 3M BEF, or 3M DBEF, is positioned in front of the cavity 118' between the lamps 132' and the AMLCD display device 116' to improve image uniformity and brightness of the display device 116'. The diffusing layer 138' is preferably made of a non-birefringent material.

The enclosure 144' of flame simulating apparatus 100' is flared rearwardly from the display device 116' to accommodate the wider backlight 118'. The sidewalls 140' of the enclosure 144' preferably extend from the lateral edges of the display device 116' to the lateral edges of the backlight 118'.

A simulated firebox 160' may comprise brick-patterned panels 180' simulating the sides of a firebox extending from the lateral edges of the display device 116' to locations on the backlight 118' inward from its lateral edges. For example, the side panels 180' may extend perpendicular to the display device 116'. The side panels 180' are nearly transparent (rather than reflective, as in the embodiment of FIG. 2), to allow light from the left and right margins of the backlight 118' to be transmitted therethrough to the left and right margins of the display device 116', as indicated by the dashed line of sight 155' of viewer 130' illustrated in FIG. 3. A simulated firebox 160' may also comprise a third highly-transmissive brick-patterned film panel 170' substantially covering a section of the backlight 118' between the side panels 180' to assist providing the illusion of a firebox.

With reference to the embodiments of FIGS. 2-3, the video images displayed on display device 116, 116' may be specially modified. An unmodified video image of flames in a fireplace will normally be somewhat dark in the areas around the flames. When a non-emissive display panel is used for display device 116, 116', such as an AMLCD, the dark areas of the video image may inhibit the ability of the viewer 130, 130' to see the simulated objects of the fuel bed (112) and firebox 160, 160' behind the display device 116, 116'. Consequently, special attention should be paid to the video images supplied by the signal source 120.

Preferably, the video images are lightened in their periphery, near the edges of the display device 116, 116', to have light colors, such as light brown for example, rather than darkened regions. The light colors may improve transmission through the display device 116, 116'. The regions immediately adjacent to the flames should remain dark, however, to provide good contrast in the flame images. Lightening video images in their periphery and having the regions immediately adjacent to the flames dark may be performed in many manners. One exemplary manner is to use software, such as video editing software, to modify the background for digital video so that the peripheral background may be lighter when compared to the regions immediately adjacent to the flames. Another exemplary manner is to use varied lighting to modify the background to be lighter away from the flames when video of a flame is shot. Another exemplary manner is to provide a background, such as a backdrop for example, that is lighter in the periphery, that is, away from the flame, than it is near the flame when video of a flame is shot.

Thus, the areas of the image surrounding the flame may be graduated from a dark region immediately adjacent the flames to a lighter area at the edges of the image. Also, to compensate for the display device 116, 116', the illuminated rear portion (124) of the fuel bed (112) should be brighter than the front portion (126) of the fuel bed (112). For example, the rear portion (124) may need to be illuminated with twelve times greater intensity than the front portion (126) in order for the front and rear portions to appear to the viewer 130, 130' as having approximately the same brightness.

In certain embodiments, an emissive, transparent display is used with a flame simulating assembly 100, 100'. One example of a transparent display device 116 that is emissive is an EL display panel. An EL display panel may comprise a monochrome display panel with multiple static flame patterns that are quickly alternated to create a dynamic flickering and/or moving flame effect. To provide flame colors ranging from yellow to red, a set of color filters may be overlaid on the EL display panel. However, a more realistic flame color and moving flame appearance can be achieved by a high resolution full-video capable color EL display panel including color filters. Suitable EL display panels include model EL640.480/AM series of monochrome (Amber) EL panels and EL640.480/A1 series multi-color EL panels, both offered by Planar Systems, Inc. Various other emissive display technologies may be used, such as a full-color transparent OLED display, which may be of the active-matrix or passive-matrix variety.

A viewer's perception of a simulated fireplace with an emissive transparent display device 116 having a simulated fuel bed portion 124 and simulated firebox 160, as described above, located behind the display device 116, may be enhanced by illumination from a backlight 118, or from the display device 116.

For embodiments utilizing an emissive transparent display device 116, a backlight 118 may have a relatively low luminescence, for example, approximately 50 cd/m$^2$, to illuminate the simulated firebox 160, as if a fire were illuminating a firebox. The intensity of the illumination provided may correspond to the displayed image of a fire and may vary accordingly. In alternate embodiments, a backlight 118 may be omitted and the emissive transparent display device 116 may be configured to emit light on both sides, one side being used to illuminate the simulated firebox 160 and the other illuminating towards a viewer. In certain embodiments, the light from the emissive, transparent display device that illuminates the simulated firebox 160 may simulate a flickering flame to enhance a realistic view of a fire by creating flickering shadows of the simulated fuel portion 124 and illuminated glimpses of the simulated firebox 160.

Figure 4:
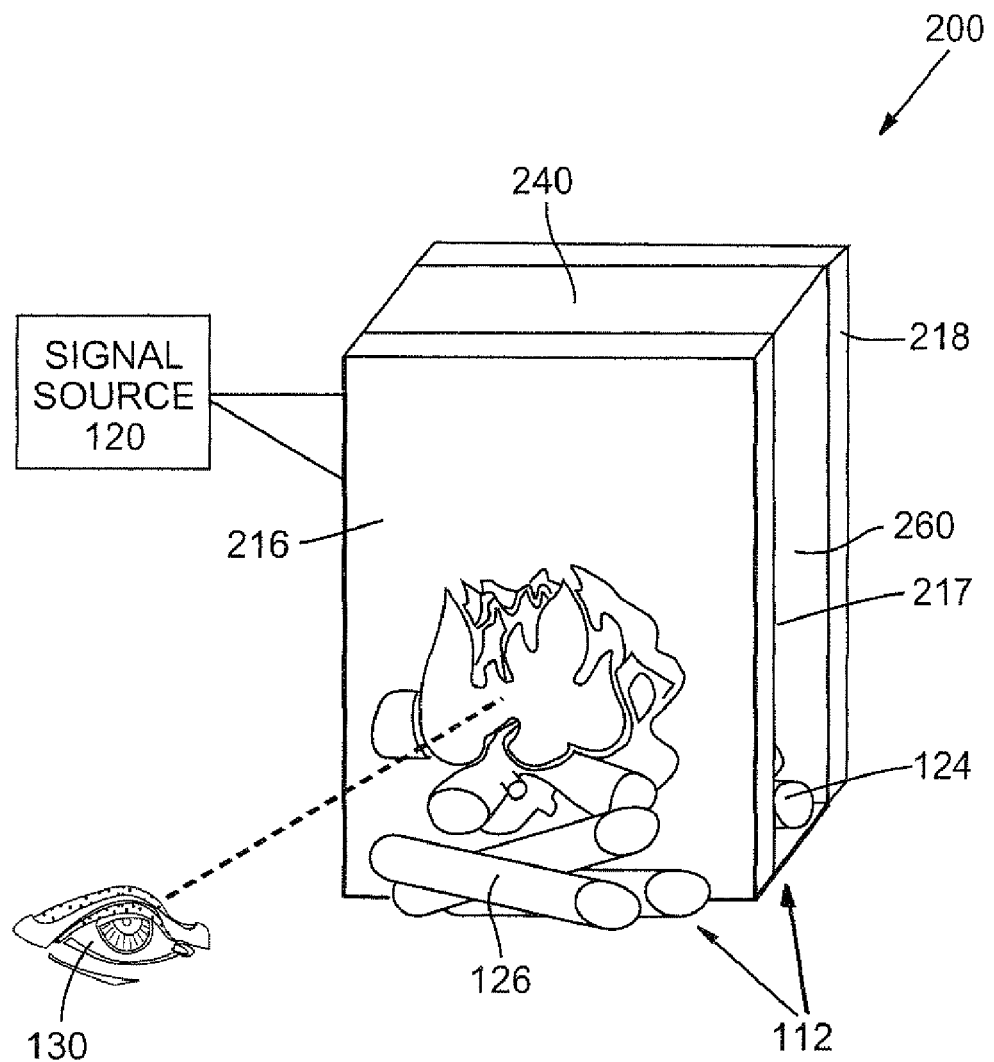
FIG. 4 is a pictorial schematic view of a flame simulating assembly according to a third embodiment.

FIG. 4 is a top view schematic representation of a flame simulating apparatus 200 in accordance with a third embodiment. The flame simulating apparatus 200 includes an AMLCD display device 216, or other suitable transparent display, a backlight 218 spaced apart from the display device 216, and a diffusion layer 217 proximate the back side of display device 216. The diffusion layer 217 is preferably made of a non-birefringent material. Generally, the front side of the display device 216 faces a viewer and the back side of display device 216 faces the simulated firebox 160. The diffusion layer 217 is switchable between permitting an observer 130 to view objects behind the display device 216 and preventing an observer 130 from viewing objects behind the display device 216 as discussed below. A simulated fuel bed 112 having a rear portion 124 positioned between the diffusion layer 217 and the backlight 218 and a front portion 126 positioned in front of the display device 216 may also be included with flame simulating apparatus 200.

Configuring the diffusion layer 217 to be switchable between permitting an observer 130 to view objects behind the display device 216 and preventing an observer 130 from viewing objects behind the display device 216 may be accomplished mechanically, or electro-optically, as discussed below. When the diffusion layer 217 is configured to prevent viewing objects behind the display device 216, the diffusion layer transmits light from backlight 218 and diffuses the light. The diffusion layer 217 may therefore act as a diffusing layer to provide illumination from the backlight 218 to the display device 216 and permit the display device 216 to function as a television or other display. When the diffusion layer 217 is configured to permit viewing objects behind the display device 216, the diffusion layer does not substantially interfere, or may not interfere at all, with viewing the simulated firebox 260 or the fuel portion 124, and display device 216 functions similarly to display device 116 described above.

Placing the diffusion layer 217 proximate the back side of display device 216 may be accomplished in a variety of manners. In some embodiments, the diffusion layer 217 is proximate the back side of display device 216 by physical contact between the diffusion layer 217 and the display device 216. In other embodiments, the diffusion layer 217 may be affixed to display device 216 by an adhesive or other suitable substance. In other embodiments, diffusion layer 217 may be physically separated from the display device 216. Other embodiments may utilize other arrangements for placing the diffusion layer 217 proximate the back side of the display device 216.

The backlight 218 may be spaced apart from the display device 216 by approximately the same distance as in the embodiments of FIGS. 2 and 3. In some embodiments, alternate backlight arrangements may be used. The backlight 218 may also be sized and utilized with side reflectors 150 as in the embodiment of FIG. 2, or sized and utilized without side reflectors 150, as in the embodiment of FIG. 3.

Mechanically configuring diffusion layer 217 to be switchable between permitting an observer 130 to view objects behind the display device 216 and preventing an observer 130 from viewing objects behind the display device 216 may be accomplished by utilizing a rigid diffusing material, such as milky plastic, that may be removed from or inserted into the housing (not shown) of flame simulating apparatus 200. The diffusion layer 217 may be inserted into the housing (not shown) and placed proximate the back side of display device 216 in order to prevent viewing objects behind the display device 216, for example the simulated fuel portion 124. In order to view objects behind display device 216, the diffusion layer 217 may be removed from the housing (not shown) and moved to a stowed position, such as behind flame simulating assembly 200, for example. Mechanically configuring diffusion layer 217 to be switchable between permitting an observer 130 to view objects behind the display device 216 and preventing an observer 130 from viewing objects behind the display device 216 may also be accomplished by utilizing a flexible material, such as Mylar®, for diffusion layer 217. A flexible diffusion layer 217 may be rolled into a stowed position to permit viewing objects behind display device 216, and unrolled into its position proximate the back side of display device 216 to prevent viewing objects behind display device 216. Other mechanical arrangements for moving the diffusion layer 217 may also be used.

Configuring the diffusion layer 217 to be electro-optically switchable between permitting an observer 130 to view objects behind the display device 216 and preventing an observer 130 from viewing objects behind the display device 216 may be accomplished by utilizing a material that is switchable between a translucent state and a transparent state. For example, a polymer dispersed liquid crystal (PDLC), or other suitable material, may form the diffusion layer 217. In certain embodiments, when the signal source 120 provides video signals comprising video images of flames to the flame simulating apparatus 200, a diffusion layer 217 may be made transparent (for a PDLC, a voltage is applied to activate the material). With the display device 216 displaying images of flames, and the diffusion layer 217 being transparent, the flame simulating apparatus 200 simulates a fire in a simulated firebox 260 similar to the embodiments of FIGS. 2 and 3 described above.

The flame simulating apparatus 200 may also function similarly to a television or other video display when a material having a translucent state and a transparent state comprises the diffusion layer 217. When the signal source 120 provides video signals comprising video, or still images to the flame simulating apparatus 200, the diffusion layer 217 may be made translucent (for a PDLC the de-activated state is translucent and light diffusing). Making the diffusion layer 217 translucent prevents, or substantially prevents, a viewer 130 from viewing the simulated firebox 260 and the portion of the simulated fuel bed 124 that lies behind display device 216. The diffusion layer 217 may therefore act as a diffusing layer to provide illumination from the backlight 218 to the display device 216 and permit the display device 216 to function as a television or other display.

The display device 216 may unction as a non-transparent television or other display when an image of a flame is transmitted by the signal source 120, and may also function in its transparent mode when an image other than a flame is transmitted by the signal source 120.

In certain embodiments, the simulated fuel bed portion 126 may be moved or removed when the display device 216 functions as a television or other display. For example, a viewer may physically remove the simulated fuel bed portion 126, or the simulated fuel bed portion 126 may be mechanically lowered into the housing (not shown) of the flame simulating apparatus 200.

In some embodiments, the diffusion layer 217 may be the same size as the display device 216 and the entirety of the diffusion layer 217 may be made either transparent or translucent (for electro-optically activated diffusion layers). In other embodiments, the diffusion layer 217 may comprise portions that are less than the full size of display device 216 and, for electro-optically activated diffusion layers, may be switched between a transparent state and a translucent state. Or, the diffusion layer 217 may be smaller than the display device 216, for example, leaving portions of the display 216 transparent.

In certain embodiments, good thermal management is important. For example, the operating temperature of an AMLCD panel should not exceed the isotropic clearing point of the liquid crystal display material. A blower or other means may be included to provide for forced air flow in the gap between the display device 116, 116', 216 and the backlight 118, 118', 218 to help cool the display device 116, 116', 216. A separate device, such as a heat sink, vent, or second forced air passage behind the backlight 118, 118', 218 may be used for cooling the backlight 118, 118', 218, alone or in combination with a first cooling device.

It will be obvious to those having skill in the art that many changes may be made to the details of the above-described embodiments without departing from the underlying principles of the invention. The scope of the present invention should, therefore, be determined only by the claims.

The invention claimed is:

1. A flame simulating apparatus, comprising:
   a transparent active matrix liquid crystal electronic display device;
   a backlight spaced apart from the display device;
   a simulated fuel bed located between the backlight and the display device; and
   first and second sidewalls extending between the display device and the backlight.

2. The flame simulating apparatus of claim 1, further comprising a reflector coincident to at least one of the sidewalls.

3. The flame simulating apparatus of claim 1, in which the display device is coupled to a signal source transmitting a signal representing an image of flickering flames.

4. The flame simulating apparatus of claim 3, wherein the signal is modified to lighten the image around the periphery of the flickering flames.

5. The flame simulating apparatus of claim 1, further comprising a diffusion layer proximate a back side of the display device, the diffusion layer switchable between permitting viewing objects behind the display device and preventing viewing objects behind the display device.

6. The flame simulating apparatus of claim 5, wherein the diffusion layer is switchable between permitting viewing objects behind the display device and preventing viewing objects behind the display device by being configured to move from its position proximate the back side of the display device to a stowed position and by being configured to move from its stowed position to its position proximate the back side of the display device, respectively.

7. The flame simulating apparatus of claim 5, wherein the diffusion layer comprises a material that is switchable between a transparent state and a translucent state.

8. The flame simulating apparatus of claim 7, wherein
the flame simulating apparatus comprises a simulated fireplace when a signal from the signal source represents an image of flickering flames and the diffusion layer is in its transparent state; and
wherein flame simulating apparatus comprises a television when a signal from the signal source represents an image and the diffusion layer is in its translucent state.

9. The flame simulating apparatus of claim 5, wherein the backlight is substantially wider than the display device to facilitate viewing of margins of the display device from an angle.

10. The flame simulating apparatus of claim 9, further comprising:
a first semi-transparent panel bearing an image of the inside of a firebox, the first semi-transparent panel extending between a display device first side and the backlight;
a second semi-transparent panel bearing an image of the inside of a firebox, the second semi-transparent panel extending between a display device second side and the backlight; and
a third semi-transparent material bearing an image of the inside of a firebox, the third semi-transparent material at least substantially covering the backlight at least between the first and second semi-transparent panels.

11. A flame simulating apparatus, comprising:
a transparent electronic display device;
a backlight spaced apart from the display device to accommodate at least a portion of a simulated fuel bed between the backlight and the display device;
first and second sidewalls extending between the display device and the backlight; and
a semi-transparent material bearing an image of the inside of a firebox, the semi-transparent material at least substantially covering the backlight.

12. The flame simulating apparatus of claim 11, further comprising a reflector coincident to at least one of the sidewalls.

13. The flame simulating apparatus of claim 12, wherein the reflector bears an image resembling the inside of a firebox.

14. A flame simulating apparatus, comprising:
a transparent electronic display device;
a backlight spaced apart from the display device to accommodate at least a portion of a simulated fuel bed between the backlight and the display device, wherein the backlight is substantially wider than the display device to facilitate viewing of margins of the display device from an angle; and
first and second sidewalls extending between the display device and the backlight.

15. The flame simulating apparatus of claim 14, further comprising:
a first semi-transparent panel bearing an image of the inside of a firebox, the first semi-transparent panel extending between a display device first side and the backlight;
a second semi-transparent panel bearing an image of the inside of a firebox, the second semi-transparent panel extending between a display device second side and the backlight; and
a third semi-transparent material bearing an image of the inside of a firebox, the third semi-transparent material at least substantially covering the backlight at least between the first and second semi-transparent panels.

16. A flame simulating apparatus, comprising:
a transparent electronic display device having a front side and a back side, the display device being a light-emitting display device;
a back wall positioned facing the back side of the display device;
first and second sidewalls extending between the display device and the back wall;
a backlight spaced apart from the display device to accommodate at least a portion of a simulated fuel bed between the backlight and the display device; and
a semi-transparent material bearing the image of the inside of a firebox, the semi-transparent material at least substantially covering the backlight; wherein:
the display device emits light from both the front side and the back side; and
the back wall, first sidewall, and second sidewall cooperate to form a simulated firebox, the simulated firebox bearing an image of the inside of a firebox.

17. The flame simulating apparatus of claim 16, wherein the light emitted from the front side of the display device simulates a flickering fire, and the light emitted from the back side of the display device simulates a flickering fire.

18. The flame simulating apparatus of claim 16, wherein the image of the inside of a firebox comprises a pictorial image of brickwork.

19. The flame simulating apparatus of claim 16, further comprising a reflector coincident to at least one of the sidewalls.

20. A flame simulating apparatus, comprising:
a transparent electronic display device having a front side and a back side, the display device being a light-emitting display device;
a back wall positioned facing the back side of the display device;
first and second sidewalls extending between the display device and the back wall; and
a reflector coincident to at least one of the sidewalls; wherein
the display device emits light from both the front side and the back side; and
the back wall, first sidewall, and second sidewall cooperate to form a simulated firebox, the simulated firebox bearing an image of the inside of a firebox.

21. The flame simulating apparatus of claim 20, wherein the light emitted from the front side of the display device simulates a flickering fire, and the light emitted from the back side of the display device simulates a flickering fire.

22. The flame simulating apparatus of claim 20, wherein the image of the inside of a firebox comprises a pictorial image of brickwork.

* * * * *

UNITED STATES PATENT AND TRADEMARK OFFICE
CERTIFICATE OF CORRECTION

PATENT NO. : 8,230,626 B2
APPLICATION NO. : 12/441531
DATED : July 31, 2012
INVENTOR(S) : Adiel Abileah et al.

It is certified that error appears in the above-identified patent and that said Letters Patent is hereby corrected as shown below:

In the Specifications:

In column 1, line 21, please replace "niped" with --piped--.

In column 1, line 32, please replace "2006/0162198," with --2006/0162198.--.

In column 3, line 62, please replace "lensiets" with --lenslets--.

In column 6, line 2, please replace "EL640.480)A1," with --EL640.480A1,--.

In column 8, line 6, please replace "unction" with --function--.

Signed and Sealed this
Eighteenth Day of December, 2012

David J. Kappos
*Director of the United States Patent and Trademark Office*